Aug. 13, 1929.　　　H. C. CUSHING　　　1,724,751
COFFEE METER
Filed Nov. 9, 1927　　2 Sheets-Sheet 1

Herbert C. Cushing, INVENTOR
BY Victor J. Evans
ATTORNEY

Aug. 13, 1929.   H. C. CUSHING   1,724,751
COFFEE METER
Filed Nov. 9, 1927   2 Sheets-Sheet 2
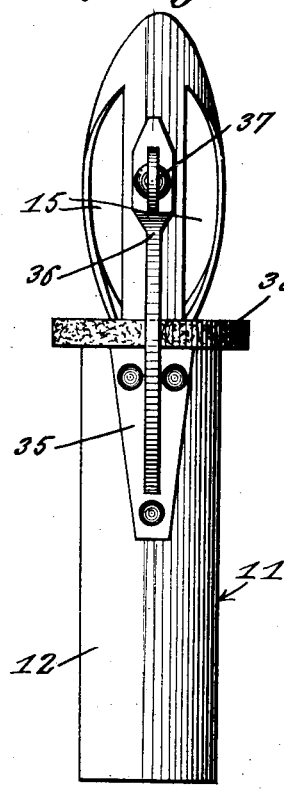
Fig. 2.
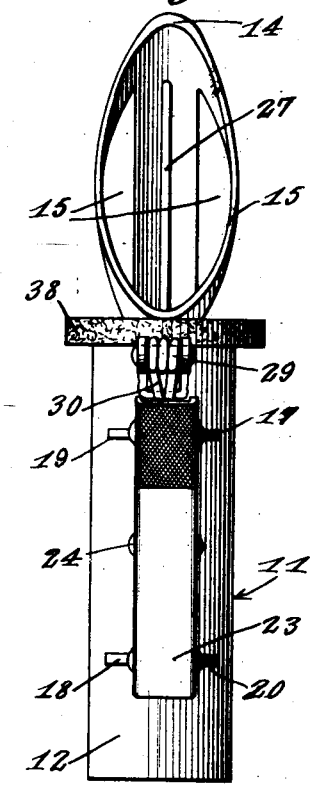
Fig. 3.
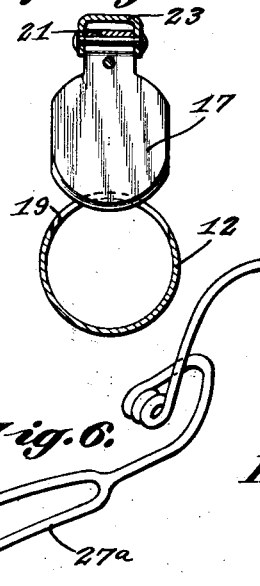
Fig. 4.
Fig. 6.
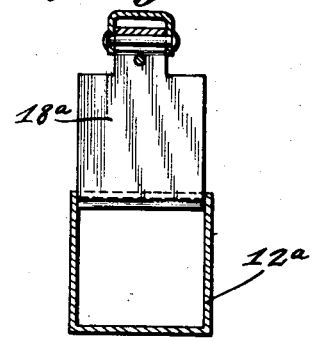
Fig. 5.
Herbert C. Cushing, INVENTOR
BY Victor J. Evans
ATTORNEY Patented Aug. 13, 1929.

1,724,751

UNITED STATES PATENT OFFICE.

HERBERT C. CUSHING, OF BABB, MONTANA.

COFFEE METER.

Application filed November 9, 1927. Serial No. 232,113.

The present invention relates to attachments for containers such as are used for coffee, sugar, salt and condiments of all kinds.

Objects of the invention are to provide an attachment of this character which may be used to form an aperture in the container and which may be secured thereto for dispensing the contents of the said container.

Another object is to provide means whereby the contents of the container to which the attachment is connected may be dispensed in measured quantities and means whereby the contents of the can may be agitated to cause them to flow into the attachment.

Other objects are simplicity of construction and operation, cheapness of manufacture and effectiveness in use.

Still further objects and advantages will appear from the following description and will be set forth in the subjoined claims, and I do not wish to be limited in the scope of my invention except as I shall be limited by said claims.

In the drawings:

Figure 2 is a rear plan view of my invention disconnected from the container and showing the bracket for attaching the same to the container.

Figure 3 is a view from the opposite side of the dispensing apparatus, showing the lever and the agitating member related thereto.

Figure 4 is a sectional view on the line 4—4 of Figure 1 of one of the cut off valves and showing its connection with the dispensing tube and with the operating lever.

Figure 5 is a modified form of the dispensing tube and of one of the cut off valves.

Figure 6 is a detail view of one form of the agitator.

Figure 1:
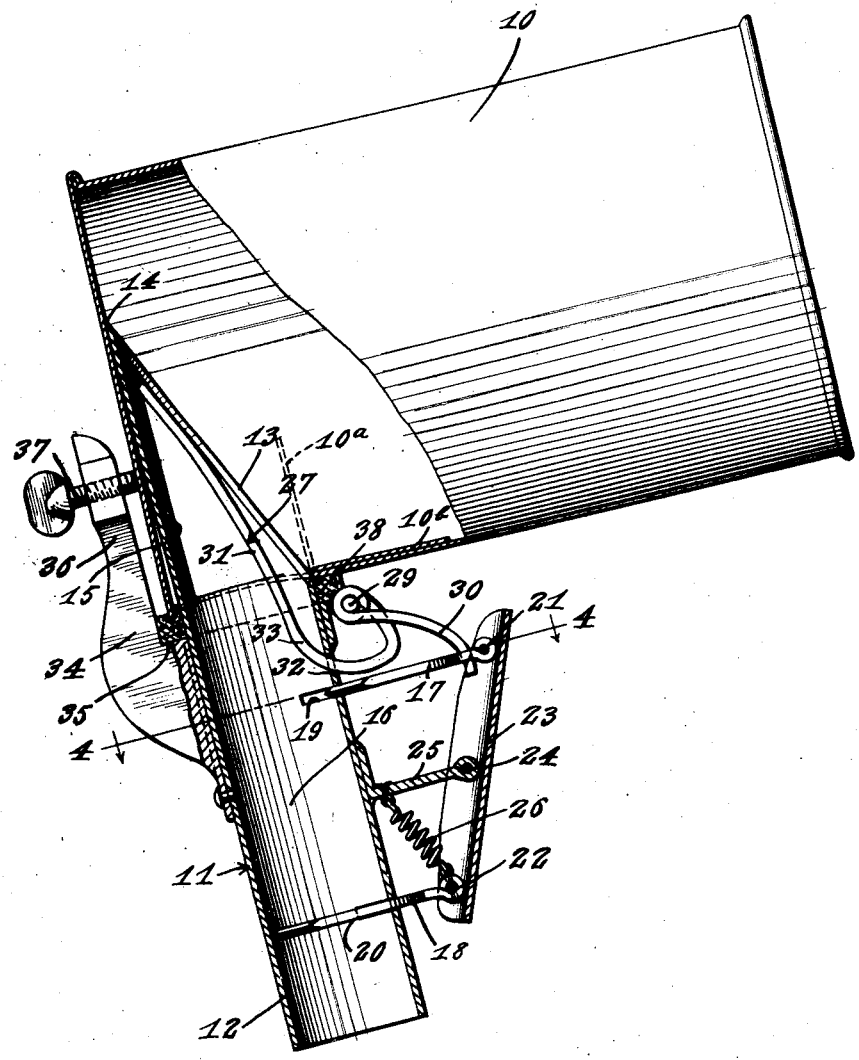
Figure 1 represents a container, as a coffee can, showing my invention attached thereto, the same being shown in longitudinal section to more clearly disclose the operative parts thereof.

Referring to the drawings by reference numerals, 10 designates a container, as a coffee can, having a part of the wall thereof broken away to show the interior of the can. 11 designates generally a dispensing attachment constituting the subject of my invention. The dispensing attachment comprises a tubular member 12 having one end thereof beveled off as at 13, said beveled portion being sharpened as at 14 to form a cutting edge which may be used to form an incision in the can to which the device is to be attached. The device is preferably made of metal but may be made of any suitable material, and the beveled end 13 has its walls cut out as at 15 to provide for the passage of the contents of the container 10 into the dispensing and measuring chamber 16 of the dispensing attachment. A pair of valves 17 and 18 are provided and are adapted to operate in slots 19 and 20 formed in the tubular member 12 and lying in spaced relation to each other and in planes at right angles to the axis of the tube, said valve members being pivotally connected as at 21 and 22 to a rocker lever 23 which is pivotally mounted at 24 to a support 25 extending from and attached to the walls of the tubular member 12. The lower valve is normally held closed by means of a helical spring 26, one end of which is attached to the base of the support 25 and the other to the pivotal point of the valve 18 with the rocker arm 23.

An agitating lever 27 is pivotally mounted at 29 to the exterior of the tubular member 12 and is provided with one arm 30 extending to a position in the path of the lever 23 and having an arm 31 extending through an aperture 32 in the tubular member and into the beveled end of said tubular member. The portion 33 of the arm 31 adjacent the aperture 32 is curved into a sector of a circle having the pivotal point 29 as its center.

The tubular member is also provided with a bracket arm 34 having a shoulder 35 for a purpose which will presently appear. The end 36 of the bracket lies in spaced relation to the beveled end of the tube 12 and is provided with an aperture through which a winged set screw 37 is threaded for clamping the dispensing attachment 11 to the container in the manner as shown in Figure 1.

In order to render the device leak-proof and to prevent air or other foreign matter from entering the container, I provide a buffer member 38 which rests against the shoulder 35 of the bracket 34 and is adapted to be held in close contact with the dispensing can and around the aperture formed therein by the dispensing attachment by means of the bracket 34 and the winged set screw carried thereby. The buffer 38 is preferably made of elastic material such as felt, rubber, or the like.

The operation of this device is as follows: When it is desired to attach the same to a can the edge 14 is pressed against the side of the can, preferably near one end thereof, and an incision is made which gradually enlarges as the member 11 is pressed upon and the beveled end 13 is projected into the can, as shown in Figure 1, cutting out a portion of the can 10, as shown in dotted lines at 10ª, which may be bent back into the position shown at 10ᵇ against the inner wall of the container. When the beveled end 13 has been projected into the can sufficiently to bring the buffer member 38 into sealing contact therewith, the clamping screw 37 is rotated, binding the end of the can against the rear wall of the beveled portion 13. The member 27 is then oscillated by pressure on the arm 30 if found necessary and a portion of the contents of the can is moved into the tubular member 12. The material is prevented from escaping from the tubular member 12, however, by the valve 18 which is normally closed. Presuming that the material in the can is coffee in pulverized form, a measured quantity thereof will be dispensed into a percolator or other suitable receptacle by holding the open end of the tube 12 over the said receptacle and moving the valve 17 inwardly against the influence of the spring 26 and at the same time moving the valve 18 outwardly. This operation may be repeated as often as is necessary to dispense the desired amount. The space between the valves 17 and 18 may be so constructed that it will measure a given amount, as a table spoon full, of the material contained in the can. The agitator 27, it will appear from Figure 1, will be operated with each movement of the lever 23, but may be also operated independently thereof by pressure on the arm 30. While the tubular member 12 may be cylindrical as shown in Figure 4, it may also be of any other shape found desirable and in Figure 5 is shown a modification in which the tubular member 12ª is square, in which case, of course, the valve 18ª will be of a corresponding shape. The agitator 27 may be provided with a single prong as shown in Figure 1, or may have a plurality of prongs 27ª as shown in Figure 6.

Having described my invention, what I claim is:

1. A dispensing device adapted to be used in connection with containers, comprising a tubular member having a portion adapted to be projected through an aperture in the container, valves adapted to be selectively projected into the bore of said tubular member to prevent the passage of material thereby, said valves lying in spaced relation along said tubular member, an agitator carried by the tubular member, and means common to the agitator and valves for operating the agitator and for simultaneously operating said valves alternately to open and closed partitions.

2. A tubular dispensing apparatus adapted to be removably secured to containers and having a portion thereof adapted to extend into said container, an agitating device pivoted to the exterior of said dispensing device and having an arm adapted to project into the interior of said container, means for moving said arm for agitating the contents of said container, valves adapted to be projected across the bore of said dispensing device, a rocker member pivotally mounted on said dispensing device to the opposite ends of which the valves are attached, and means for holding one of said valves normally closed.

3. A tubular dispensing device adapted to be attached to a container, means on said dispensing device for forming an aperture in the container, said means being adapted to be projected into the container in the operation of forming said aperture, a buffer member surrounding said tubular dispensing device and adapted to rest against the container about said aperture to prevent leakage therefrom, means for agitating the contents of said container comprising a lever pivoted exteriorly of the dispensing device and having an arm projecting into said container, a second arm projecting from the pivotal point outwardly, and means for securing said dispensing device to the container.

In testimony whereof I affix my signature.

HERBERT C. CUSHING.